United States Patent

Nordloh et al.

Patent Number: 5,601,305
Date of Patent: Feb. 11, 1997

[54] BALL-AND-SOCKET JOINT FOR CHASSIS PARTS IN MOTOR VEHICLES

[75] Inventors: Alfons Nordloh, Visbek; Volker Grube, Diepholz, both of Germany

[73] Assignee: Lemförder Metallwaren AG, Lemförde, Germany

[21] Appl. No.: 540,949

[22] Filed: Oct. 11, 1995

[30] Foreign Application Priority Data

Oct. 12, 1994 [DE] Germany ............... 44 36 428.8

[51] Int. Cl.⁶ .................. B60G 7/02; F16C 11/08
[52] U.S. Cl. .................................... 280/674
[58] Field of Search .............................. 280/674

[56] References Cited

U.S. PATENT DOCUMENTS

| | | | |
|---|---|---|---|
| 3,693,999 | 9/1972 | Wood, Jr. | 280/674 |
| 4,613,251 | 9/1986 | Bellamy et al. | 280/674 |
| 5,165,306 | 11/1992 | Hellon | 280/674 |
| 5,318,373 | 6/1994 | Buhl et al. | 280/674 |

FOREIGN PATENT DOCUMENTS

| | | |
|---|---|---|
| 1014441 | 8/1957 | Germany. |
| 7424445 | 6/1976 | Germany. |
| 3522013-A1 | 1/1987 | Germany. |
| 3828683C2 | 6/1990 | Germany. |

Primary Examiner—Kenneth R. Rice
Attorney, Agent, or Firm—McGlew and Tuttle

[57] ABSTRACT

A ball-and-socket joint for chassis parts in motor vehicles, in which a joint ball provided on a pivot pin is mounted within a housing in a sliding shell made of plastic, wherein the outer jacket of the sliding shell is tightly enclosed by the inner jacket of the housing. To compensate manufacturing tolerances, a material, which is highly elastic compared with the material of the sliding shell, is arranged in a recess on the outer jacket of the sliding shell (4) at least at points of increased load by the joint ball.

6 Claims, 4 Drawing Sheets

BALL-AND-SOCKET JOINT FOR CHASSIS PARTS IN MOTOR VEHICLES

FIELD OF THE INVENTION

The present invention pertains to a ball-and-socket joint for chassis parts in motor vehicles, in which a joint ball provided on a pivot pin is mounted within a housing in a sliding shell made of plastic, whose outer jacket tightly encloses the housing with an inner jacket and has recesses.

BACKGROUND OF THE INVENTION

A ball-and-socket joint possessing these features has been known from DE 38 28 683-C2. Lubricant-filled grooves are provided on the inner sliding surface of the sliding shell in the prior-art ball-and-socket joint, and flat recesses, which make possible a radial deformation of the sliding shell in the direction of the housing in order to hereby counteract manufacturing-related edge thickenings at the inner grooves, are provided in the area of the said grooves on the outer jacket of the sliding shell. A similar effect is achieved in the arrangement according to DE 74 24 445-U1 by a very thin sliding shell wall and ribs arranged on the outside of the sliding shell.

Multipart sliding shells made of materials of different elasticity for ball-and-socket joints have been known frown DE-AS 10 14 441. Ball-and-socket joints in which the joint ball is arranged in a hollow body that is made of an elastic material and is filled with liquid were disclosed by DE 35 22 013-A1.

Variations in the friction torque, which are undesirable per se, are inevitable due to the high rigidity of the material used to manufacture the siding shells, which is regarded highly because of its good sliding properties, as a result of tolerances in the manufacture of the ball, the housing and the sliding shell. Against a background of ever-increasing requirements in terms of lower friction torques and, at the same time, the lowest possible axial and radial spring deflection under high loads, new solutions are to be sought.

SUMMARY AND OBJECTS OF THE INVENTION

Thus, the primary object of the present invention is to achieve a reduction in the inevitable friction torques in ball-and-socket joints of the design described in the introduction by making changes in design to compensate the tolerance.

This object is accomplished according top the present invention by a ball-and-socket joint for chassis parts in motor vehicles, in which a joint ball provided on a pivot pin is mounted within a housing in a sliding shell made of plastic. The outer jacket tightly encloses the housing with an inner jacket and has recesses. A material, which is highly elastic compared with the material of the said sliding shell, is arranged in a recess on the outer jacket of the sliding shell, at least at points of increased load by the joint ball.

Compensation of the tolerances is achieved due to the arrangement of an elastic material on the outer contour of the sliding shell, without the elasticity of the joint shell being adversely affected as a result. The preferred arrangement is one in which the material, which is highly elastic compared with the material of the sliding shell, is arranged in a recess extending at least at the equator of the ball on both sides of the equatorial plane. An expensive limitation of the manufacturing tolerances can be achieved by the features of the present invention. The elastic material can be arranged annularly or even only partially on the outer contour of the sliding shell, and the expansion and the cross section of the recess filled with highly elastic material can be adapted to the actual joint design and to the loads expected to occur on the joint during the operation. It is particularly advantageous that the sliding shell can be designed as a one-part sliding shell, as before, and the advantageous design features obtained over long years of operation can be maintained.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
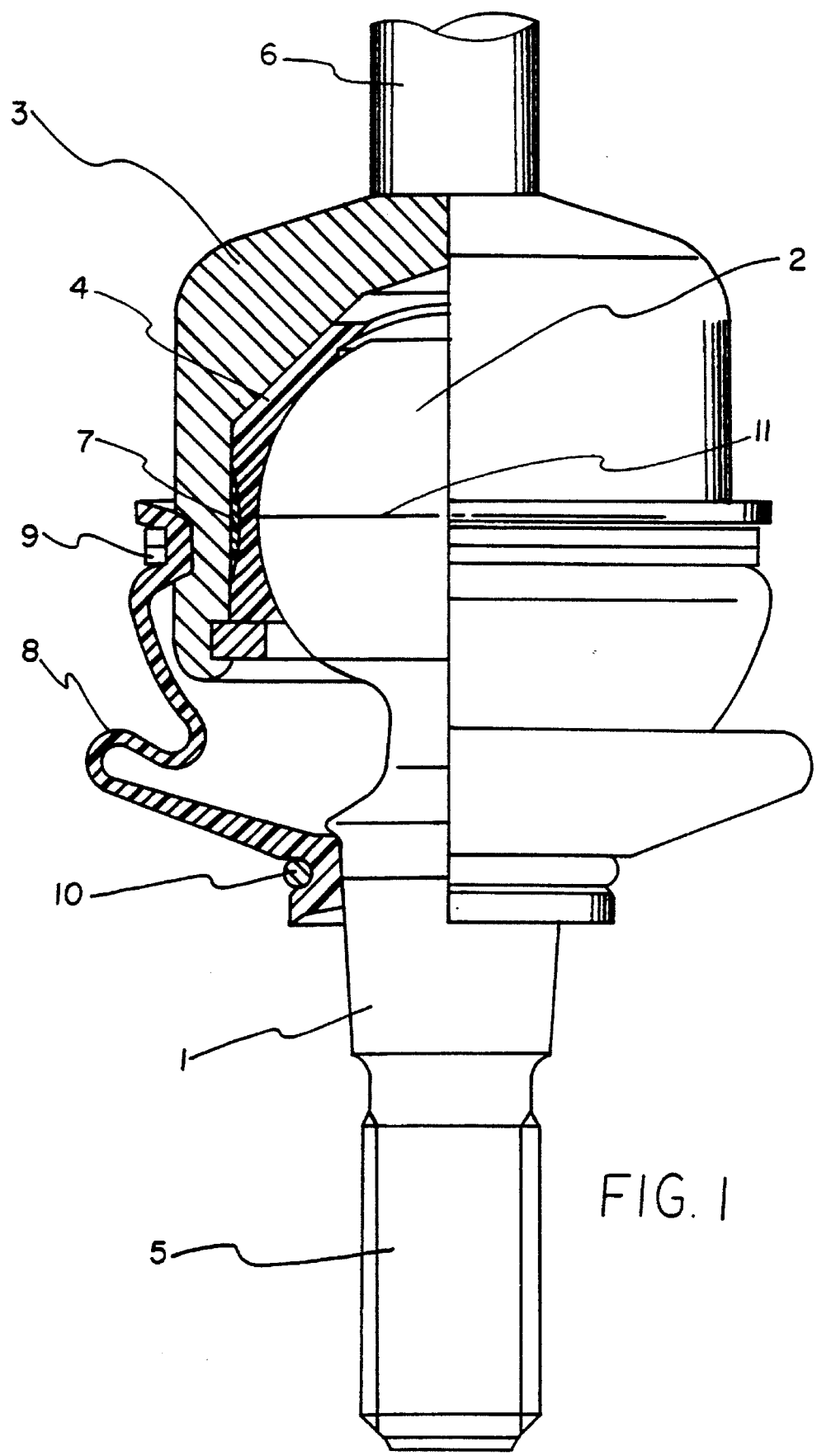
FIGS. 1 through 3 are different exemplary embodiments, half as a side view and half as a sectional view through an axial plane.

The ball-and-socket joint shown in the exemplary embodiments comprises a joint ball 2 provided at one end of a pivot pin 1 and a housing 3, in which the joint ball 2 is mounted movably in all directions by means of a sliding shell 4, wherein the sliding movement takes place between the surface of the joint ball 2 and the inner surface of the sliding shell 4. With an inner jacket, the housing 3 encloses the outer jacket of the sliding shell 4 such that the sliding shell 4 is radially supported by the housing 3. The pivot pin 1 can be connected to a chassis part by fastening means 5 provided on the pivot pin 1, and the housing 3 can be connected to another vehicle part by fastening means 6.

To compensate the tolerance, a material 7, which is highly elastic compared with the elastic material of the sliding shell 4, is arranged between the outer jacket of the sliding shell 4 and the inner jacket of the housing 3 in a recess, which is designed partially or circumferentially advantageously on the outer circumference of the sliding shell 4. In the exemplary embodiment according to FIG. 1, this elastic material 7, having a lens-shaped cross section, is arranged approximately in the area of the equator 11 of the joint ball, so that the elastic material extends on both sides of the equatorial plane. The elastic material 7 may extend over a more or less large longitudinal area in the circumferential direction, e.g., it may also be designed circumferentially. The shape of the recess accommodating the elastic material 7 can be adapted to different joint designs and to their principal operating loads.

Figure 2:
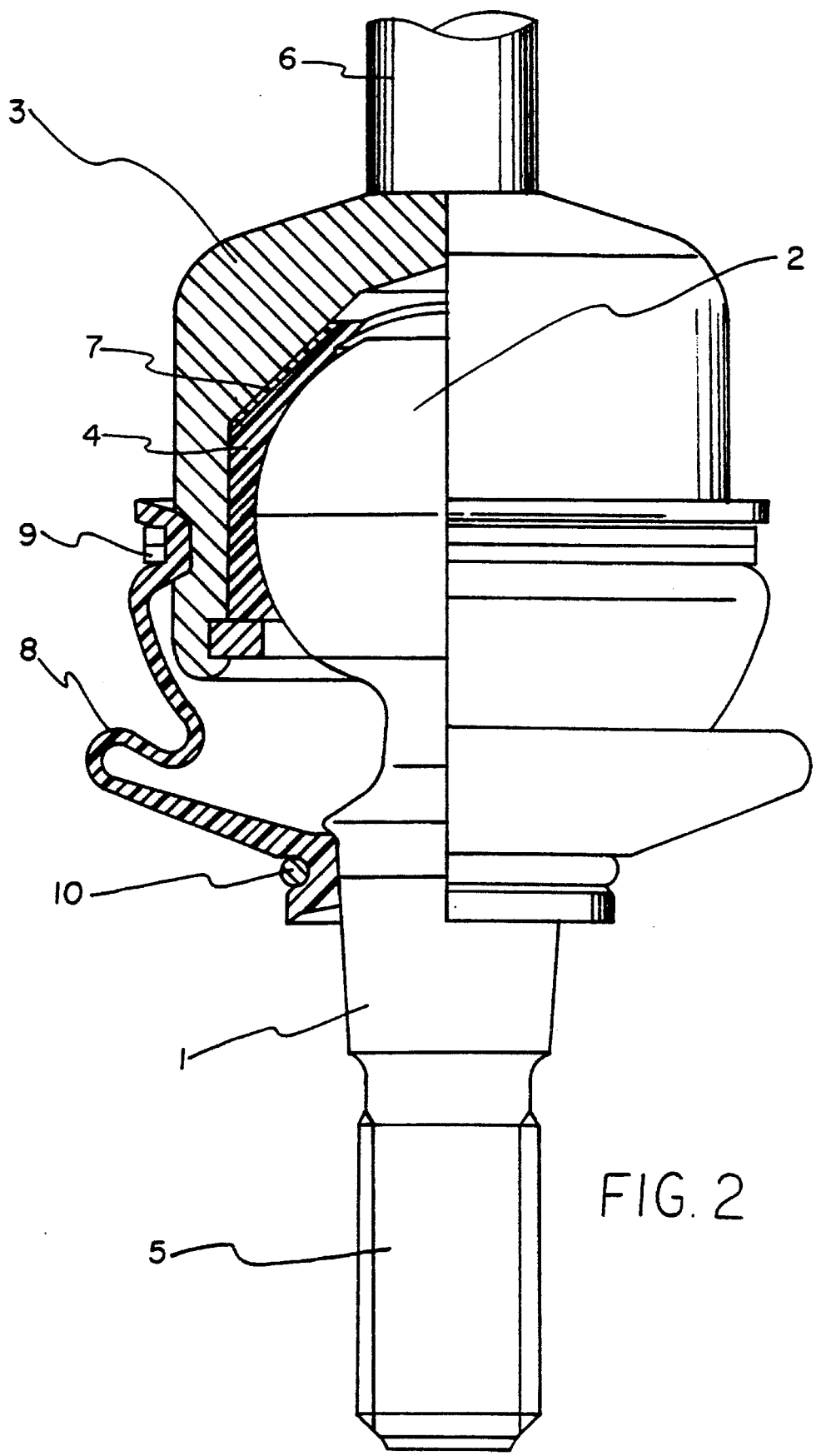

The exemplary embodiment according to FIG. 2 is a ball-and-socket joint loaded predominantly in the axial direction of the pivot pin 1, so that the elastic material 7 is arranged in an area in which essential axial forces are transmitted between the ball-and-socket joint 2 and the housing 3. The elastic material 7 is arranged as a relatively thin layer at certain points or in an annular circumferential pattern. In connection with this exemplary embodiment, FIG. 3 shows an arrangement in which the elastic material 7 is arranged both in the area of the cylindrical inner wall of the housing and in the area of an oblique surface of the housing which transmits axial forces in order to allow the elastic material to act in terms of tolerance compensation under both radial and axial loads on the joint.

Figure 3:
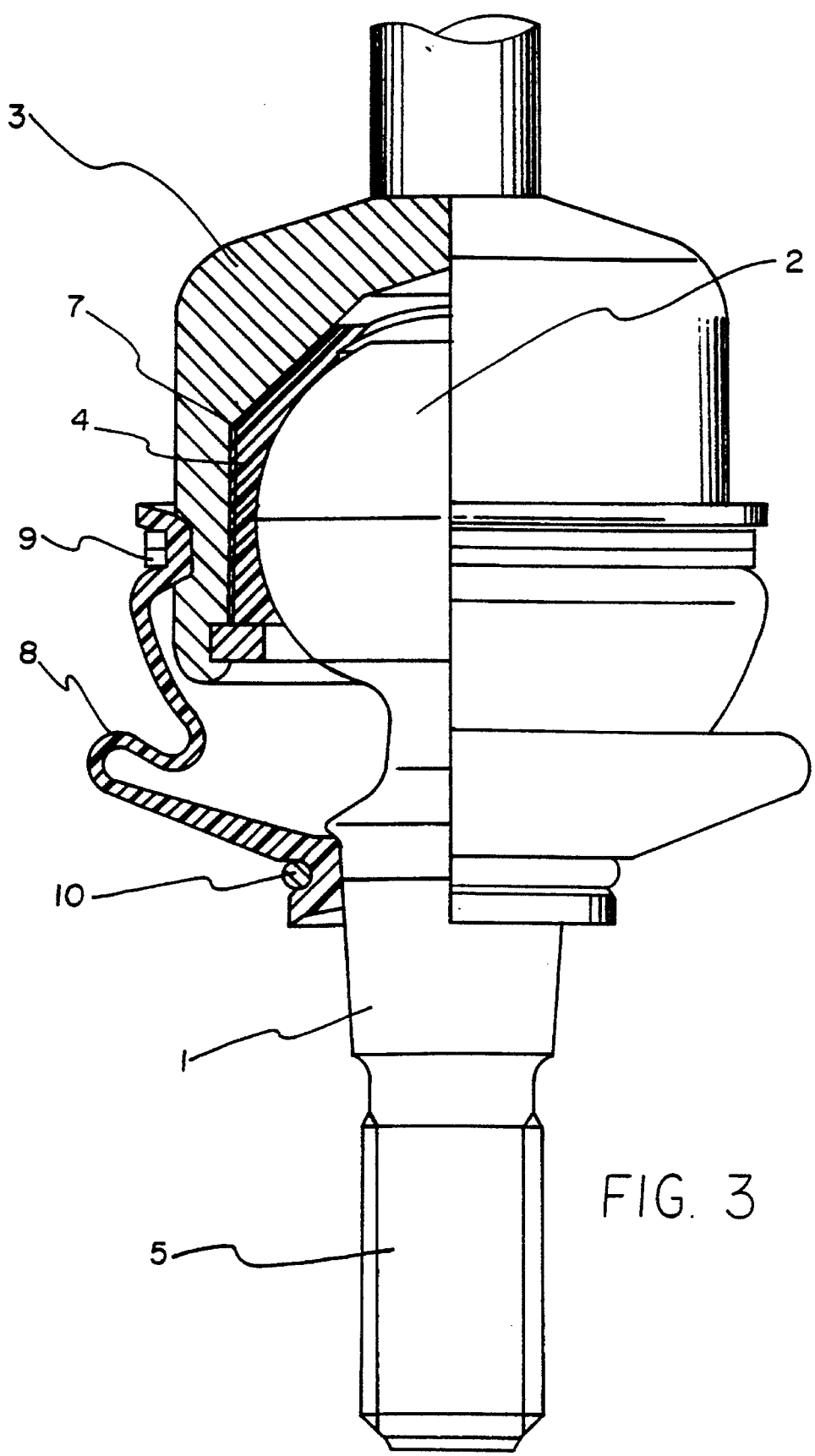
Figure 4:
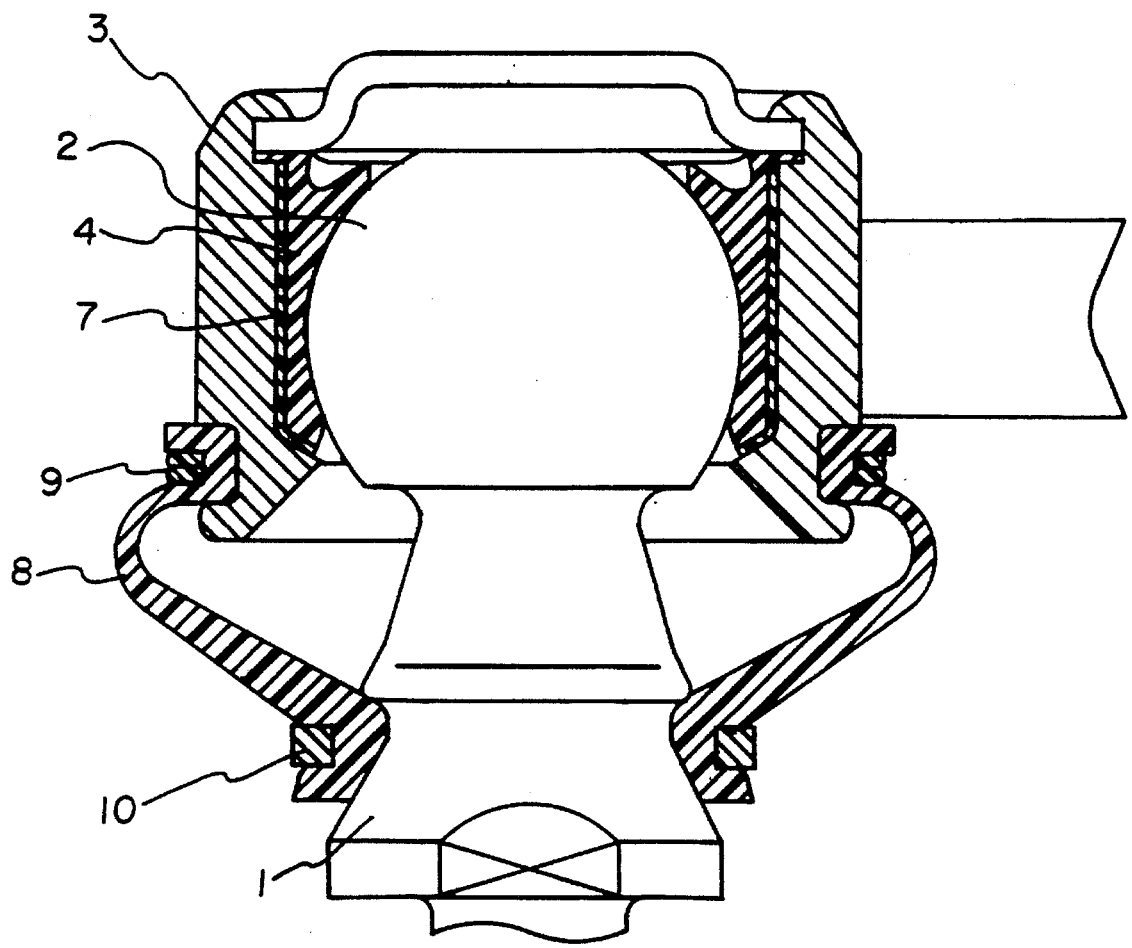
FIG. 4 is a sectional view of another exemplary embodiment through an axial plane.

A design of the ball-and-socket joint which is slightly modified compared with FIGS. 1 through 3 is shown in FIG. 4. The housing 3 of the ball-and-socket joint encloses a cylindrical outer wall of the sliding shell with a cylindrical inner wall, and a thin layer 7 of highly elastic material is located between the two cylindrical walls. The elastic material 7 can be arranged only partially or circumferentially in the circumferential direction in this exemplary embodiment.

The shapes of the housing, the pivot pin and the sliding shell are different in the exemplary embodiments. The design of the closure between the joint ball 2 and the housing 3 is different as well. The gap between the edge of the open housing side, from which the pivot pin 1 is led out, and the pivot pin is closed in all exemplary embodiments by a sealing bellows 8 made of an elastic material, whose bead-like end is held in a groove on the housing by means of a lock washer 9 or the like, on the one hand, and on the shaft of the pivot pin 1, likewise by means of a lock washer 10, on the other hand.

While specific embodiments of the invention have been shown and described in detail to illustrate the application of the principles of the invention, it will be understood that the invention may be embodied otherwise without departing from such principles.

What is claimed is:

1. A ball-and-socket joint for chassis parts in motor vehicles, the ball-and-socket joint comprising:

a joint ball;

a pivot pin, said joint ball being provided on said pivot pin;

a housing;

a sliding shell made of plastic, said joint ball being mounted within said housing in said sliding shell, said sliding shell having an outer jacket which is tightly enclosed by an inner jacket of the housing, said outer jacket having recesses, a highly elastic material which is highly elastic compared with material of the said sliding shell is arranged in a recess on the outer jacket of the said sliding shell.

2. The ball-and-socket joint in accordance with claim 1, wherein said recess is provided at least at points of increased load of said joint ball.

3. The ball-and-socket joint in accordance with claim 1, wherein the said highly elastic material is arranged in said recess extending at least about an of said joint ball equator, on both sides of an equatorial plane.

4. The ball-and-socket joint in accordance with claim 1, wherein said highly elastic material is arranged partially at points of increased radial load in recesses on said outer jacket of the said sliding shell.

5. The ball-and-socket joint in accordance with claim 1, wherein said highly elastic material is arranged circumferentially in one or more annular recesses.

6. The ball-and-socket joint in accordance with claim 1, wherein said highly elastic material is applied in the manner of a sleeve to the outer jacket of said sliding shell and extends on both sides of an equatorial plane of said joint ball essentially over the height of the said sliding shell.

* * * * *